(No Model.)
R. LAVERY.
DIFFERENTIAL GEARING.
No. 298,697. Patented May 13, 1884.
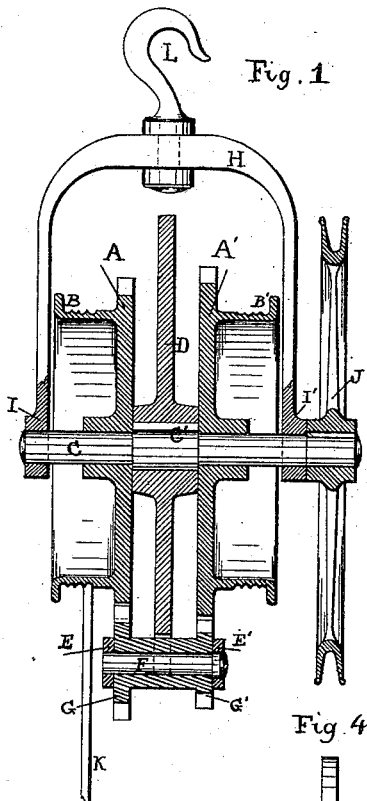
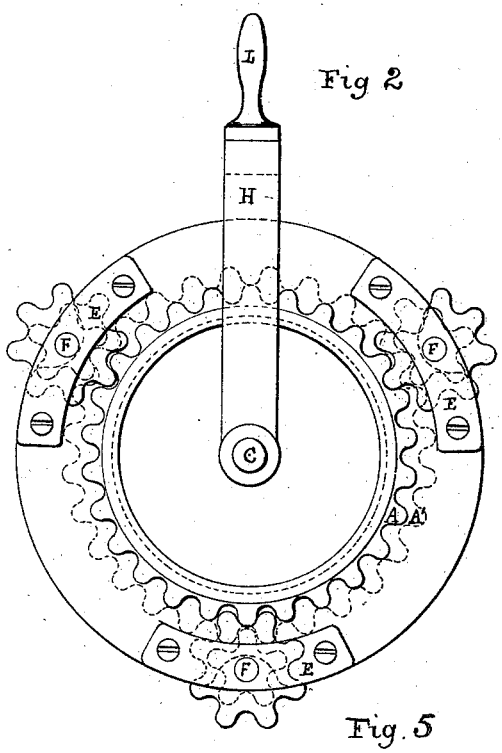
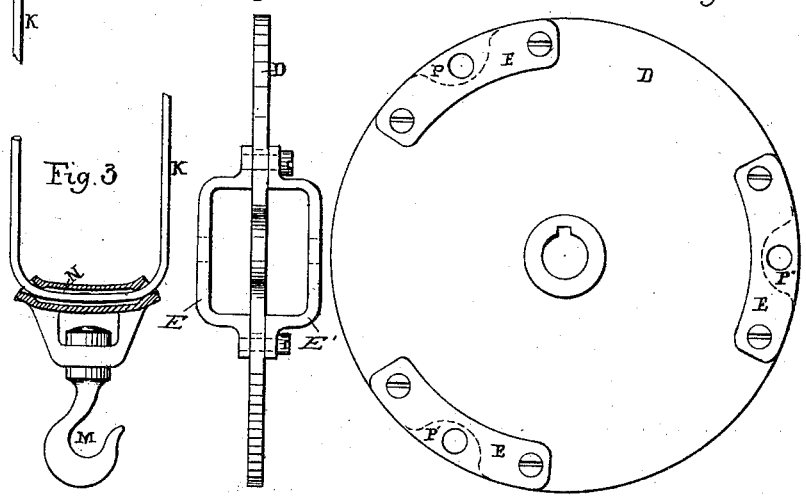
Witnesses.
Geo. L. Lavery.
S. L. Lavery.
Inventor
Richard Lavery

UNITED STATES PATENT OFFICE.

RICHARD LAVERY, OF SOUTH BOSTON, MASSACHUSETTS.

DIFFERENTIAL GEARING.

SPECIFICATION forming part of Letters Patent No. 298,697, dated May 13, 1884.

Application filed February 23, 1884. (No model.)

*To all whom it may concern:*

Be it known that I, RICHARD LAVERY, a citizen of the United States, residing at South Boston, in the county of Suffolk and State of Massachusetts, have invented certain new and useful Improvements in Differential Gearing for Hoisting and other Purposes, of which the following is a specification.

My invention is an improvement on my previously-patented inventions for differential gearing for hoisting and other purposes.

The objects of my invention are a more equal distribution and balancing of the load, greater stability of the working parts, and less liability to wear; and to that end I use two drums with external gearing attached, and to these drums the rope or chain is secured, and one or more sets of coupled pinions mounted and free to revolve upon outside bearings carried by a central wheel, whereby the pinions are held in position more securely, and are less liable to twist and wear the journals out of truth.

Referring to the accompanying drawings, which form part of this specification, Figure 1 shows a vertical section through center of machine; Fig. 2, a side elevation; Fig. 3, a detail of swivel-hook; Figs. 4, 5, a detail of central wheel, showing outside bearings and method of fastening same to wheel.

A A' are two central external toothed gears of unequal diameters and number of teeth, with winding-drums or chain-wheels B B' attached or made as a whole, each mounted and free to revolve upon a central shaft, C.

D is a wheel mounted upon and secured to shaft C at C'. Upon the rim of wheel D outside bearings, E E', E E', E E', are secured, upon which shafts F F F are carried or journaled.

G G', G G', G G' are coupled pinions of unequal diameter and number of teeth, secured together or made as a whole, mounted and free to revolve upon the shafts F F F; or they can be secured to or made as a whole with the shafts F F F, and revolve upon the bearings E E', E E', E E'. The two central external toothed gears, A A', may be of equal diameter and number of teeth when in combination with coupled pinions G G', G G', G G' of unequal diameters and number of teeth, and the coupled pinions G G', G G', G G' may be of equal diameter and number of teeth when in combination with the central external toothed gears, A A', of unequal diameter and number of teeth. For the drums B B' chain or sprocket wheels may be substituted.

H is a hanger with bearing I I', upon which the central shaft, C, is mounted and free to revolve.

J is a sheave-wheel for rope or chain, secured to shaft C for applying power to operate the machine.

K is a wire rope secured to drums B B', on which it is wound and unwound; or a common hemp or fiber rope may be used.

L is a swivel-hook for hanging machine in position; M, swivel-hook where load is applied.

N is a chambered hole filled with soft metal, into which the wire rope is embedded, whereby the rope is preserved.

D, Figs. 4, 5, is a wheel hollowed out at P P' P'', which, with the outside bearings, E E', E E', E E', forms pockets to receive the coupled pinions G G', G G', G G', and by reason of the bearings being outside the pinions greater strength and stability are obtained and wear is greatly reduced.

The operation is as follows: By applying power at the sheave-wheel J a rotary motion is given to the shaft C, and also to the wheel D, to rim of which the outside bearings, E E', E E', E E', are attached. The coupled pinions G G', G G', G G', having their axes in the shafts F F F, carried by the outside bearings, will roll upon the periphery and gear into the central external toothed gears, A A', and by reason of the coupled pinions G G', G G', G G' having unequal diameters and number of teeth, and the central gears, A A', of diameters and number of teeth to match the greater and less diameters of the coupled pinions to which they are geared, a differential motion is imparted to the central gears, A A', and drums B B', the gear A and drum B revolving in one direction, and the gear A' and drum B' in the opposite direction. The rope or chain K, being secured to the drums B B', will be wound around them in opposite directions, and thereby raise the load. By reversing the motion of the sheave-wheel J the load will be lowered or held suspended when motion ceases.

I am aware that differential gearing with a fixed central gear, in combination with a pinion or pinions and a second central revolving-gear, has been used, and also that differential gearing with a central gear, in combination with a locking and unlocking device, whereby the gear can be made revolving or non-revolving at will, for both of which I have received Letters Patent. I therefore do not intend to claim either of these constructions; but

What I claim as my invention, and desire to secure by Letters Patent, is—

1. The combination of two external toothed gears of equal diameters and number of teeth, mounted and free to revolve upon a central axis, with one or more sets of coupled pinions of unequal diameters and number of teeth, free to revolve and carried upon bearings secured to the rim of a central wheel, said pinions rolling around and gearing into the two external toothed gears, for the purpose specified.

2. The combination of two external toothed gears of unequal diameters and number of teeth, mounted and free to revolve upon a central axis, with one or more sets of coupled pinions of equal diameters and number of teeth, free to revolve and carried upon bearings secured to the rim of a central wheel, said pinions rollings around and gearing into the two external toothed gears, for the purpose specified.

3. The combination of two external toothed gears of unequal diameters and number of teeth, mounted and free to revolve upon a central axis, with one or more sets of coupled pinions of unequal diameters and number of teeth, free to revolve and carried upon bearings secured to the rim of a central wheel, said pinions rolling around and gearing into the two external toothed gears, for the purpose specified.

4. The combination of the two central external toothed gears, A A', with the coupled pinions G G', G G', G G', shafts F F F, outside bearings, E E', E E', E E', the wheel D, central shaft, C, bearings I I', and hanger H, substantially as shown, and for the purpose specified.

5. The outside bearings, E E', E E', E E', in combination with the wheel D, shafts F F F, coupled pinions G G', G G', G G', gears A A', drums B B', and shaft C, substantially as shown and specified, and for the purpose set forth.

6. The combination of the two drums B B' with the gears A A', coupled pinions G G', G G', G G', bearings E E', E E', E E', shafts F F F, wheel D, and the central shaft, C, supported as described, substantially as shown, and for the purpose set forth.

7. The chambered hook M, swivel or otherwise, containing soft-metal or other packing for the protection of the rope or hoisting-rigging, substantially as shown.

In testimony whereof I have signed my name to this specification in the presence of two subscribing witnesses.

RICHARD LAVERY.

Witnesses:
 JOS. H. ADAMS,
 GEO. L. LAVERY.